H. B. HOLTVOIGT.
CASTER WHEEL FOR AGRICULTURAL IMPLEMENTS.
APPLICATION FILED JULY 7, 1917.

1,252,574. Patented Jan. 8, 1918.

Inventor
Henry B. Holtvoigt
by Allen & Allen
Attorneys

UNITED STATES PATENT OFFICE.

HENRY B. HOLTVOIGT, OF DAYTON, OHIO, ASSIGNOR TO THE OHIO RAKE COMPANY, OF DAYTON, OHIO, A CORPORATION OF OHIO.

CASTER-WHEEL FOR AGRICULTURAL IMPLEMENTS.

1,252,574.     Specification of Letters Patent.     Patented Jan. 8, 1918.

Application filed July 7, 1917. Serial No. 179,220.

*To all whom it may concern:*

Be it known that I, HENRY B. HOLTVOIGT, a citizen of the United States, and a resident of Dayton, in the county of Montgomery and State of Ohio, have invented certain new and useful Improvements in Caster-Wheels for Agricultural Implements, of which the following is a full, clear, and exact description, reference being had to the accompanying drawings, forming part of this specification.

My invention relates to caster wheels for agricultural implements, such as side delivery rakes in which means are provided for elevating or letting down the end of the rake or implement supported by the wheel from the driver's seat.

In such implements as rakes, it is ordinarily a tedious operation to elevate the frame at the rear so that the rake teeth will clear the ground while driving the machine over the road, for example. Not only this, but the caster wheels are of comparatively small size and will drop into holes in the field or on the road, which will let down the rake frame, and perhaps bend the teeth or break them.

It is the object of my invention to provide means operated by a bar from the driver's seat for increasing or decreasing the distance of the caster wheel from the rake frame on which it is mounted. It is also my object to so construct the device that the caster wheel will resiliently drop and raise out the small holes without pulling down the rake frame.

The above objects and other advantages to be noted are accomplished by that special construction and arrangement of parts to be hereinafter more specifically pointed out and claimed.

Figure 1:
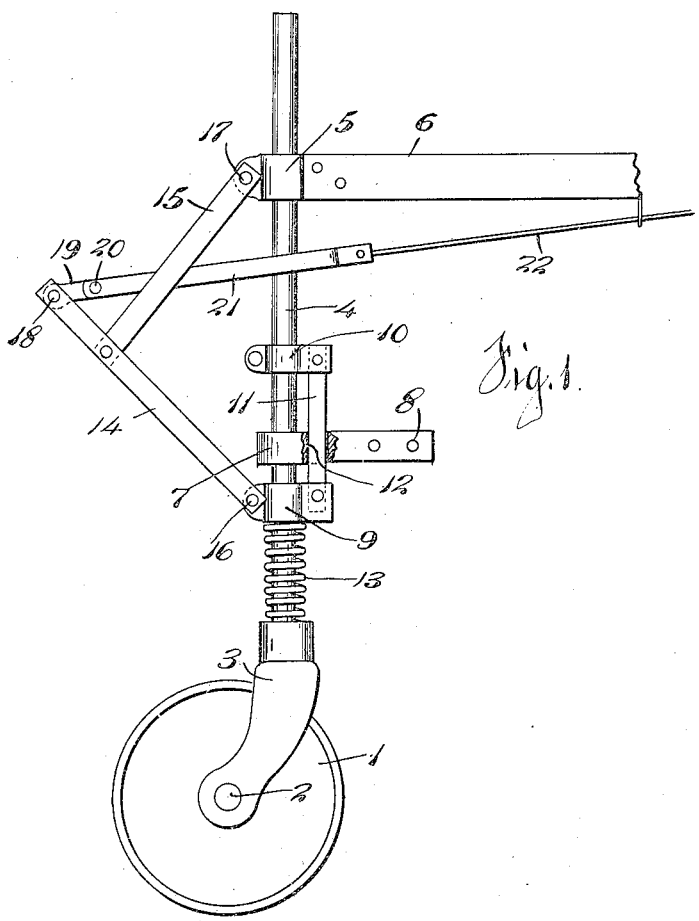
Figure 1 is a side elevation of the device.

1 is the caster wheel which is suitably journaled at 2 in the bifurcated arm 3. The arm 3 is mounted on a post 4. The post passes through a journal 5 on the top frame member 6 of such implement as the device is used with, and mounted lower down on the post is a journal 7, which is secured by means of arms 8 to a lower frame member. As so far described, the post would slide freely up and down with relation to the frame. Mounted over the post is a lower sliding collar 9 and an upper sliding collar 10, which are connected by a bar 11. The bar 11 rides in a slot at 12 in the journal 7, and beneath the collar 9 is a heavy spring 13.

There are two toggle levers 14 and 15, which are preferably composed of two spaced bars connected by pins. The toggle 14 is pivoted at 16 in the lower collar 9, and the upper toggle is pivoted at 17 to the fixed collar or journal 5 on the frame 6.

Figure 2:
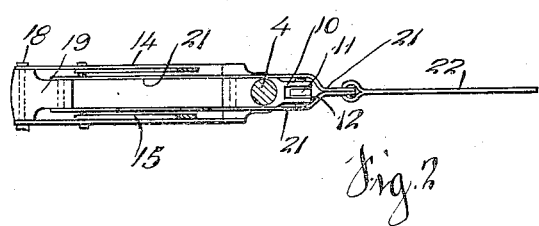
Fig. 2 is a top plan view thereof, showing it disconnected from the rake or other implement.

Mounted on the outer pin 18 of the lower toggle is a knuckle plate 19, and pivotally mounted at 20 to the plate 19 is the double pull bar member 21. The toggles 14 and 15 and the pull bar member 21 are of a size to fit within each other, as best shown in Fig. 2. The pull bar portion 21 is made double so that it will pass around the post 4 on each side, thereby clearing the post.

For operating the device from the driver's seat, the main pull bar 22 is provided, which is connected to the pull bar member 21 of the toggle device.

As above described, the operation of the device is as follows: The caster wheel and post are set on the frame and the pull bar 22 is advanced forwardly, thereby pushing the collar 9 away from the upper pivot of the toggle system at 17, and this will press the spring 13 and force the post down so as to extend the distance between the frame 6 and the caster wheel 1. The farther the pull is advanced forwardly, the farther down the caster wheel will be impelled. To allow the rake frame to descend toward the ground, the bar will be released and the weight of the frame will cause a flexing of the toggle so as to permit the frame to descend. Thus the pull bar 22 might be a flexible member without seriously detracting from the advantages of the device.

The spring 13 can take up all severe jolts to the caster wheel 1, and when the caster wheel drops into a hole, it can be seen that the plate 19, pivoted at 20 to the pull bar structure and at 18 to the toggle structure, will give sufficiently to allow for a sudden drop in the caster wheel, when the pull bar 22 is a rigid structure.

It is believed that the structure of the device will be readily understood from the above description and that its advantages over the old hand method of raising and lowering the caster wheel of a rake are obvious. It is understood that it is old to provide a resilient mounting for caster wheels, so as to allow them to dip into chuck holes, but this structure is herein provided together with means for raising and lowering the wheel.

It is not desired that the failure to mention equivalent structures in the above description should be construed as implying limitations in the claims that follow wherein it is desired that the doctrine of equivalents be fully applied in their construction.

Having thus described my invention, what I claim as new and desire to secure by Letters Patent, is:—

1. A caster wheel device for agricultural implements and the like, comprising a wheel and a post therefor, said post being movably mounted with relation to the implement, a toggle device connected at one end to the implement, and at the other to the post, and a pull element connected to the toggle and operable from the front of the implement.

2. A caster wheel device for agricultural implements and the like, comprising a wheel and a post therefor, said post being movably mounted with relation to the implement, a toggle device connected at one end to the implement, and at the other to the post, and a pull element connected to the toggle and operable from the front of the implement, said post connection of the toggle comprising a collar slidable on the post, and a spring secured to the post and bearing on the collar, for the purpose described.

3. A caster wheel device for agricultural implements and the like, comprising a wheel and a post therefor, said post being movably mounted with relation to the implement, a toggle device connected at one end to the implement, and at the other to the post, and a pull element connected to the toggle and operable from the front of the implement, said toggle device comprising levers formed of interspaced bars so as to permit them to move within each other, and the pull bar connection of said toggle to extend around both sides of the post.

4. A caster wheel device for agricultural implements and the like, comprising in combination with the wheel, its post and the implement frame, a toggle device made up of three levers, one connected to the said post adjacent the lower end thereof, one connected to the frame at the upper portion thereof, said two levers connected together, and the third lever connected to one of the above levers and extending forwardly toward the front of the implement.

5. A caster wheel device for agricultural implements and the like, comprising in combination with the wheel, its post and the implement frame, a toggle device, one end thereof connected to the frame, the middle joint thereof connected to a pull member, and the lower end thereof connected to the post by a device comprising a pair of sliding collars on the post, a spring secured to the post and bearing on the lower collar, and means connected to the frame of the implement for guiding the collars in their movement.

6. A caster wheel device for agricultural implements and the like, comprising in combination with the wheel, its post and the implement frame, a pull bar, a toggle device, one end of the toggle connected to the frame, the lower end thereof connected to the post by means of a device comprising a pair of sliding collars on the post, a spring secured to the post and bearing on the lower collar, and the middle point of the toggle connected to the pull bar, said pull bar having a pivoted knuckle plate thereon for accomplishing said connection, for the purpose described.

HENRY B. HOLTVOIGT.

Copies of this patent may be obtained for five cents each, by addressing the "Commissioner of Patents, Washington, D. C."